UNITED STATES PATENT OFFICE.

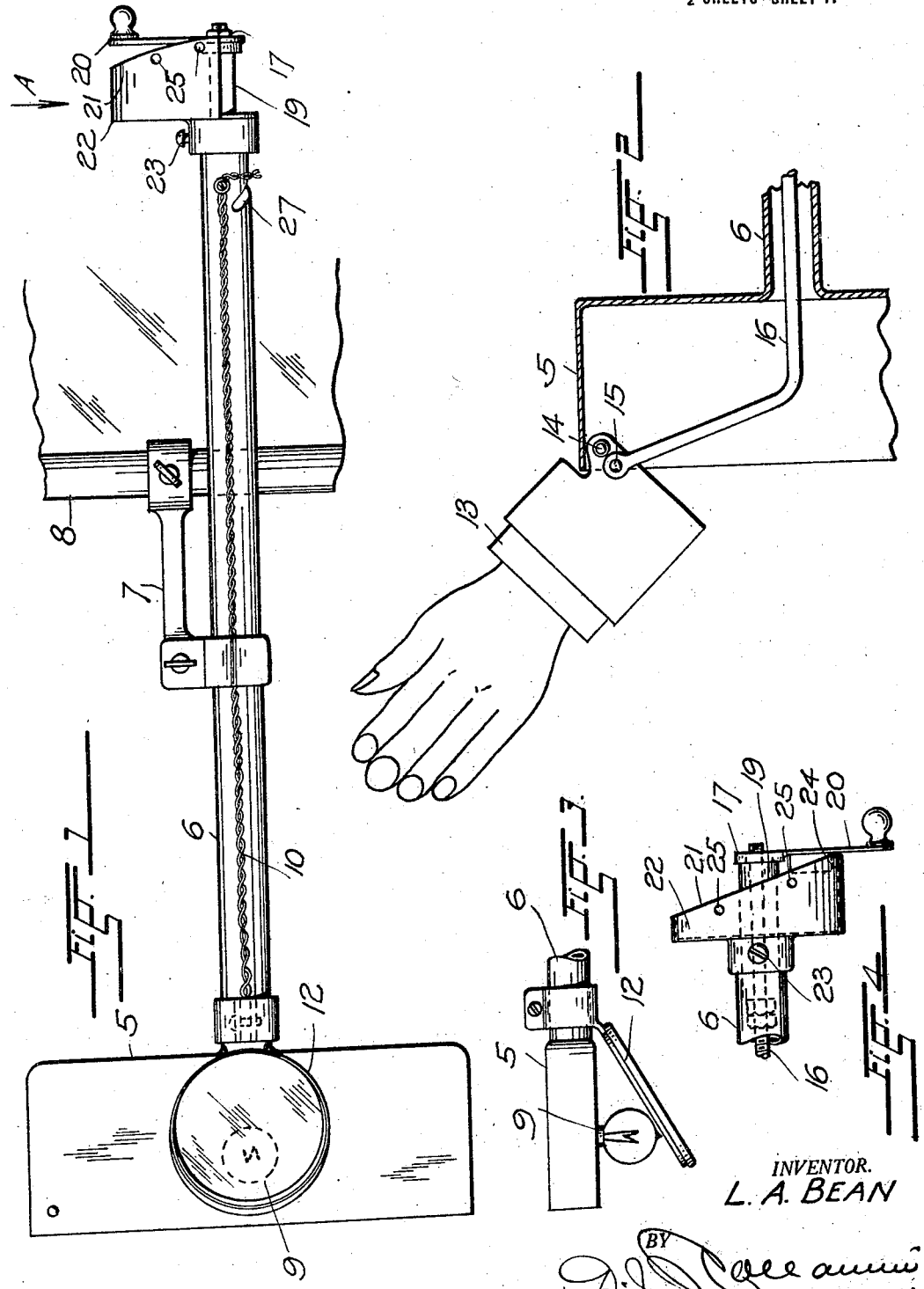

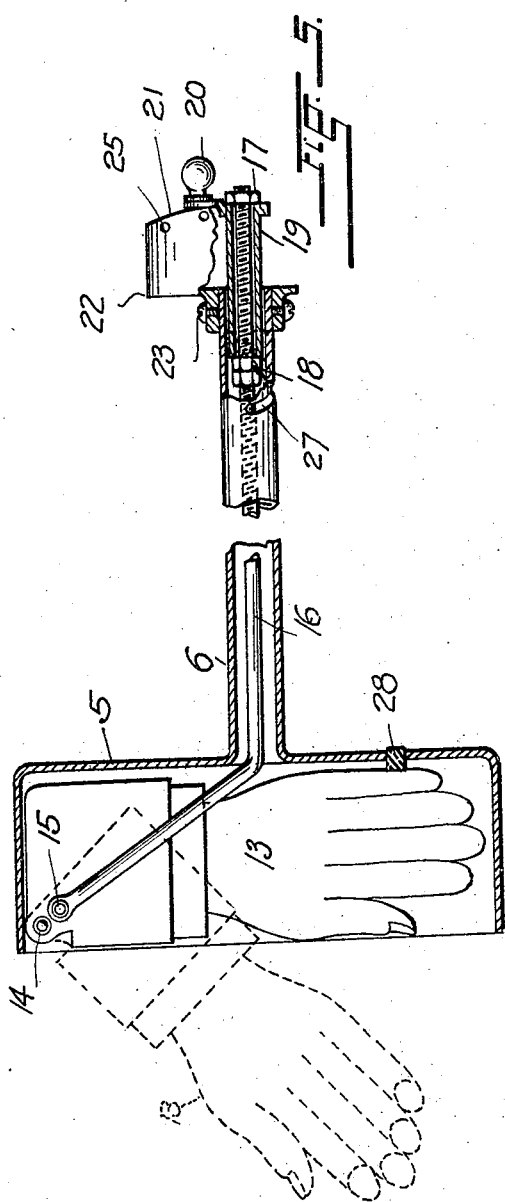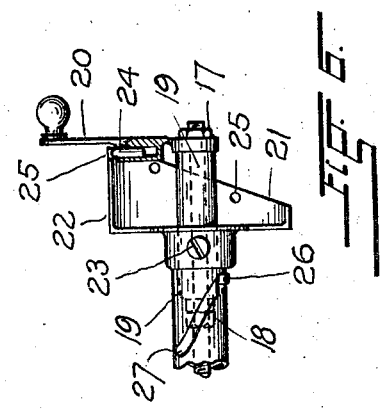

LOUIS A. BEAN, OF DENVER, COLORADO.

DIRECTION INDICATOR FOR AUTOMOBILES.

1,413,824.

Specification of Letters Patent. Patented Apr. 25, 1922.

Application filed August 16, 1920. Serial No. 403,712.

*To all whom it may concern:*

Be it known that I, LOUIS A. BEAN, a citizen of the United States, residing at Denver, in the county of Denver and State of Colorado, have invented certain new and useful Improvements in Direction Indicators for Automobiles, of which the following is a specification.

This invention relates to direction indicators for motor vehicles and its primary object is to provide a simple and efficient mechanism for projecting a signal from a side of a vehicle to warn pedestrians, and drivers of approaching or following cars, of a contemplated change in the direction or the speed of the same.

Another object of the invention is to provide a direction indicator of the character mentioned in which a signal blade may be projected to different predetermined positions to indicate either a contemplated change in the speed of the vehicle or specifically the direction in which it is about to be turned.

In certain parts of the country it is ordained by law that drivers of motor vehicles shall give visible warning of an intended stop or change of direction by extending the hand beyond the side of the vehicle in positions specified by the authorities. The code usually followed is that the hand in a downwardly directed position indicates that the speed of the vehicle is being diminished, a horizontal position of the hand denotes a turn to the left, and an upwardly directed position of the same, a turn to the right.

By the use of my improved indicator, the prescribed signals may be given by a slight adjustment of a handle adjacent the driver's seat of the vehicle, and it is another object of my invention to provide a signal which simulates the above described positions of the hand so as to bring it strictly within the provisions of the law.

With the above and other objects in view, my invention consists in the construction and arrangement of parts shown in the accompanying drawings in the various views of which like parts are similarly designated, and in which—

Figure 1 is a side elevation of my improved direction indicator in its operative position on the windshield of a motor vehicle;

Figure 2, a fragmentary sectional view of the outer portion of the indicator showing the signal blade thereof in one of the prescribed positions;

Figure 3, a top view of the casing at an end of the device, in which the signal blade is normally concealed.

Figure 4, a top view of the opposite end portion of the device looking in the direction of the arrow A, Figure 1;

Figure 5, a sectional and fragmentary elevation of the indicator showing the signal blade in another of the predetermined positions, and Fig. 6, a fragmentary view of the handle for operating the signal blade.

Referring more specifically to the drawings, my improved direction indicator comprises an oblong casing 5 mounted transversely at the end of a tubular casing 6 which by means of a suitable clamping device 7 is secured to one of the side posts of the wind shield 8 of a motor vehicle in a horizontally projecting position.

The clamping device may be of any appropriate construction and made either separate from the windshield or in integral connection with the same.

The casing which in practise extends transverso-vertically at the end of the arm, carries at its rearward side an incandescent lamp 9 which by means of wires 10 extending along the arm, is connected in an electric circuit of the motor vehicle.

A mirror 12 likewise fastened to the casing, slants rearward of the lamp as best shown in Figure 3 of the drawings, its forward side being polished to reflect the light rays emitted from the lamp onto the signal blade projected from the casing, while its opposite side is silvered to enable the driver of the vehicle to observe the movement of vehicles approaching at the rear thereof.

The signal blade 13 which preferably is made in simulation of an open hand extending from the sleeve of a garment, is pivotally mounted in the casing as at 14 to swing outwardly thereof to a selected angle.

A wrist pin 15 on the blade at a short distance from its pivot, provides a crank connection for the upturned end portion of an operating rod 16 which extends loosely through the tubular arm to which the casing is attached.

The opposite end of the rod extending through the open end of the arm, is threaded for the application of nuts 17 and 18 which hold a sleeve 19 rotatably mounted upon the rod, in an adjusted position.

A handle 20 rigidly fastened to the sleeve bears against a spiral cam 21 at the edge of a hollow head 22 which is fastened at the end of the arm by a set screw 23.

The handle carries a spring catch 24 which cooperates with notches 25 of the head to secure the blade at the opposite end of the rod in its projected positions. A pin 26 on the sleeve of the handle extends in a spiral slot 27 of the tubular arm to guide the sleeve in its combined rotary and longitudinal movements when the crank is turned along the cam-edge of the head.

It will be seen that the rotary movement of the crank in engagement with the cam, will cause the rod to move lengthwise through the tubular arm and by its crank connection with the signal blade compel the latter to turn about its pivot outside of the casing in which it is normally concealed as shown in full lines in Figure 5.

The notches in the cam head are arranged to establish the three determinate positions of the signal blade which indicate the intended changes in the movement of the vehicle as hereinbefore explained, it being understood that the entrance of the spring-urged catch into said notches locks the operating rod and the signal blade against further movement until released by forcible rotation of the crank in either direction.

The pin on the sleeve working in the slot of the arm maintains the different parts of the operating mechanism in their cooperative relation and a stop 28 of rubber or other resilient material cushions the impact of the signal blade when it is returned to its normal position inside the casing.

The slanting reflector on the side of the casing directs the light rays of the lamp onto the projected signal blade to render it clearly visible at night as well as in day time.

Having thus described my invention what I claim and desire to secure by Letters Patent is:

1. A direction indicator for automobiles comprising a support, a signal blade pivoted thereon, a longitudinally movable rod having a crank connection with the blade, a crank rotatable on the rod, a cam engaged by the crank and adapted to convert the rotary movement thereof into a longitudinal movement of the rod, and means for locking the rod in a predetermined position of the signal blade.

2. A direction indicator for automobiles comprising a support, a signal blade pivoted thereon, a longitudinally movable rod having a crank-connection with the blade, a crank rotatable on the rod, a fixed element having a cam face engaged by the crank and adapted to convert the rotary movement thereof into a longitudinal movement of the rod, and cooperative means on said element and the crank for locking the rod in a predetermined position of the signal blade.

3. A direction indicator for automobiles comprising a tubular arm, a support at an end thereof, a signal blade pivoted on the support, a rod loosely extending through the arm and having a crank connection with the signal blade, a rotary crank on the rod, a head on the arm having a cam face engaged by the crank, and a catch on the crank acting upon said head to lock the rod in a predetermined position of the signal blade.

4. A direction indicator for automobiles comprising a tubular arm having a spiral slot, a support at an end of the arm, a signal blade pivoted on the support, a rod loosely extending through the arm and having a crank connection with the signal blade, a rotary sleeve on the rod, a pin on the sleeve working in the spiral slot of the arm, a crank connected with the sleeve, a head on the arm having a cam face engaged by the crank, and a catch on the crank acting upon said head to lock the rod in a predetermined position of the signal blade.

5. In a direction indicator for automobiles, a support, means for its connection in a projecting position at a side of a motor vehicle, a projectable signal blade at the outer end of the support, an electric lamp on the support, and a mirror on the support having opposite reflective surfaces one of which deflects the light rays of the lamp onto the signal blade in a projecting position, and the other of which presents a view rearward of the vehicle to an occupant of the driver's seat thereof.

6. A direction indicator for automobiles comprising a support, a signal blade pivoted thereon, a longitudinally movable rod having a crank connection with the blade, a rotary handle operatively connected with the rod, a cam engaged by the handle and adapted to convert the rotary movement thereof into a longitudinal movement of the rod, and means for locking the handle in a predetermined position of the signal blade.

7. A direction indicator for automobiles comprising a support having a spiral slot and a cam face in substantially parallel relation, a signal blade pivoted on said member, a rod supported on the member and having a crank connection with the signal blade, a rotary element on the rod, including a handle engaging with the cam face and a part moving in the slot, and means for locking the handle on the holding member in a predetermined position of the signal blade.

8. A direction indicator for automobiles comprising a support, means for its rigid connection with a part of a vehicle in projecting relation to a side of the same, a signal blade pivoted to move in a substantially vertical plane, a rotary operating member mounted on the support, a transmission member connecting the operating member with the signal blade, means on the support cooperative with the operating member to convert its rotary movement into a pivotal movement of the signal blade, and means to lock the handle on the support in any of a plurality of predetermined positions of the blade.

In testimony whereof I have affixed my signature.

LOUIS A. BEAN.